(12) United States Patent
Koch

(10) Patent No.: US 7,725,286 B2
(45) Date of Patent: May 25, 2010

(54) DEVICE AND METHOD FOR MEASURING THE BODY TEMPERATURE OF A LIVING BEING

(75) Inventor: Jochim Koch, Ratzeburg (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 53 days.

(21) Appl. No.: 12/129,885

(22) Filed: May 30, 2008

(65) Prior Publication Data

US 2008/0300819 A1 Dec. 4, 2008

(30) Foreign Application Priority Data

Jun. 2, 2007 (DE) .................. 10 2007 025 806

(51) Int. Cl.
  *G01K 13/00* (2006.01)
  *A61B 5/00* (2006.01)
(52) U.S. Cl. ...................... 702/131; 800/549
(58) Field of Classification Search ............. 702/130, 702/131; 600/547, 549
See application file for complete search history.

(56) References Cited

U.S. PATENT DOCUMENTS

| | | | | |
|---|---|---|---|---|
| 6,929,611 | B2 * | 8/2005 | Koch | ............ 600/549 |
| 7,299,090 | B2 | 11/2007 | Koch | |
| 2003/0003289 | A1 | 2/2003 | Koch | |
| 2005/0041722 | A1 | 2/2005 | Tokita et al. | |
| 2006/0173375 | A1 * | 8/2006 | Koch | ............ 600/549 |

FOREIGN PATENT DOCUMENTS

| | | |
|---|---|---|
| DE | 2746004 A1 | 4/1979 |
| DE | 69802278 T2 | 7/2002 |
| DE | 10139705 A1 | 4/2003 |
| DE | 69631931 T2 | 1/2005 |
| DE | 102005004933 B3 | 8/2006 |
| DE | 102007025806 B3 | 6/2008 |
| EP | 0756161 A1 | 1/1997 |
| GB | 1574994 A | 9/1980 |
| GB | 2422907 A | 8/2006 |
| WO | WO9850766 A1 | 11/1998 |

* cited by examiner

*Primary Examiner*—Bryan Bui
(74) *Attorney, Agent, or Firm*—McGlew and Tuttle, P.C.

(57) ABSTRACT

A device for measuring the body temperature of a living being is provided with a sensor housing containing a first temperature sensor which can be placed on the skin of the body for detecting the skin temperature of the living being, a second temperature sensor arranged on a side of the first temperature sensor facing away from the skin of the body at a spaced location from the first temperature sensor for detecting a temperature. An analyzing unit is provided in which the body temperature is calculated according to a predetermined temperature formula containing a temperature difference based on temperatures measured by the first temperature sensor and the second temperature sensor. A compensation term expands the temperature formula. The compensation term depends on a change over time in the sensor temperature and such parameters that a temperature correction value can be determined for taking into account the heating of the sensor housing and/or of a space surrounded by the sensor housing by the contact between the sensor housing and the skin of the body.

17 Claims, 3 Drawing Sheets

DEVICE AND METHOD FOR MEASURING THE BODY TEMPERATURE OF A LIVING BEING

CROSS REFERENCE TO RELATED APPLICATIONS

This application claims the benefit of priority under 35 U.S.C. §119 of German Patent Application DE 10 2007 025 806.4 filed Jun. 2, 2007, the entire contents of which are incorporated herein by reference.

FIELD OF THE INVENTION

The present invention pertains to a device for measuring the body temperature of a living being, with a sensor housing, containing a first temperature sensor, which can be placed on the skin of the body for detecting the skin temperature of the living being, a second temperature sensor arranged on a side of the first temperature sensor facing away from the skin of the body at a spaced location from the first temperature sensor for detecting a temperature, an analyzing unit, in which the body temperature is calculated according to a preset temperature formula containing a temperature difference, which is calculated from the temperatures measured by the first temperature sensor and the second temperature sensor, and a compensation term expanding the temperature formula.

The present invention pertains, furthermore, to a method for measuring the body temperature of a living being, wherein the body temperature is calculated by means of a temperature formula, which is obtained by equating the heat flux between the tissue of the body and the sensor housing.

BACKGROUND OF THE INVENTION

DE 10 2005 004 933 B3 (corresponding to U.S. patent application Ser. No. 11/339,577 filed Jan. 26, 2006) discloses a device for measuring the body temperature of a living being with a sensor housing, which device has a first temperature sensor for detecting the skin temperature of the living being, on the one hand, and a second temperature sensor for detecting a second temperature, on the other hand, wherein the second temperature represents a temperature in the area of a side of the sensor housing facing away from the skin. The sensor housing comprises, furthermore, an analyzing unit, by means of which the body temperature of the living being is calculated according to a preset temperature formula by calculating the temperature difference between the temperatures measured by the first temperature sensor and the second temperature sensor and other parameters. In addition, the temperature formula according to the prior-art device has a compensation term, by means of which a heat flux due to energy losses which arises from the fact that the heat flux released by the body to the sensor housing of the device is not sent completely over the first temperature sensor to the second temperature sensor, is taken into account. The heat flux flowing off from the main heat flux laterally transversely between the first temperature sensor and the second temperature sensor is taken into account by the known compensation term. The prior-art device, which has proved, in principle, successful in practice, does, however, require a relatively long time until a correct body temperature value can be determined when it is used in a relatively cold environment, for example, at an ambient temperature of 5° C.

SUMMARY OF THE INVENTION

The object of the present invention is to perfect a device and a method for measuring the body temperature of a living being such that the precision of the measuring process is improved, especially under cold environmental conditions.

To accomplish the object, the device according to the present invention comprises a sensor housing, a first temperature sensor connected to the housing for placement on the skin of the body for detecting the skin temperature of the living being and a second temperature sensor connected to the housing and arranged on a side of the first temperature sensor facing away from the body at a spaced location therefrom for detecting another temperature. An analyzing unit is provided for calculating body temperature according to a predetermined temperature formula containing a temperature difference, which is calculated from the temperatures measured by the first temperature sensor and the second temperature sensor, and a compensation term expanding the temperature formula. The compensation term depends on a change over time in a sensor temperature based on the detected skin temperature and the another temperature and parameters for determining a temperature correction value to take into account the heating of the sensor housing and/or a heating of a space surrounded by the sensor housing by the contact between the sensor housing and the skin of the body The invention is characterized by the compensation term being made dependent on a change over time of the sensor temperature and such parameters that a temperature correction value can be determined to take into account the heating of the sensor housing and/or of a space surrounded by the sensor housing by the contact between the sensor housing and the skin of the body.

The special advantage of the device according to the present invention is that an accurate body temperature can be determined relatively rapidly because the temperature formula used has a compensation term, which takes into account the thermal output to be applied for heating up the sensor housing or the sensor. The basic idea of the present invention is to provide a compensation term in the temperature formula, which compensation term takes into account a dynamic heat loss of the sensor housing over a relatively early period of the adaptation becoming established until the equilibrium of the heat flux becomes established between the tissue and the sensor. The compensation term according to the present invention makes it possible to calculate correct body temperatures as soon as the first temperature sensor has assumed the skin temperature of the body after the sensor housing has been placed on the skin of the body. By determining or estimating the dynamic heat flux due to energy losses, a more accurate measuring result can be obtained more rapidly.

According to a preferred embodiment of the present invention, the first temperature sensor, which is present anyway, and the second temperature sensor are used to determine the sensor temperature necessary for the determination of the compensation term. The sensor temperature is formed by taking the mean of the skin temperature detected by the first temperature sensor and the temperature detected by the second temperature sensor, so that a determination of the sensor temperature that is sufficient for the accuracy of the compensation term is guaranteed in a simple manner.

According to a variant of the present invention, the analyzing unit comprises a computing means and a storage means, wherein at least two sensor temperature values following each other over time are stored in the storage means. It is guaranteed as a result that the compensation term according to the present invention can be calculated in the computing unit taking into account at least two sensor temperature values available offset by a predetermined time interval.

To accomplish the object, the method according to the present invention is characterized in at least two sensor temperature values being determined offset in time, so that a temperature correction value is determined as a function of parameters that determine the heat capacity of the sensor housing.

The special advantage of the method according to the present invention is that a relatively accurate measuring result is available early for determining the body temperature of a living being under relatively cold environmental conditions. A relatively accurate determination of the body temperature can be made possible already during an early dynamic adaptation period of the measuring process by sequential measurement of the sensor temperature at least two points in time and by taking into account the heat capacity of the sensor housing. The basic idea of the present invention is to compensate the distortion of the measuring results, which arises from the fact that the sensor housing or the sensor requires time to be heated up by means of the tissue of the body to the extent that there is an equilibrium between the tissue temperature and the ambient temperature. The correct measuring result can be available relatively early due to the determination according to the present invention of a temperature correction value compensating this circumstance.

An exemplary embodiment of the present invention will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
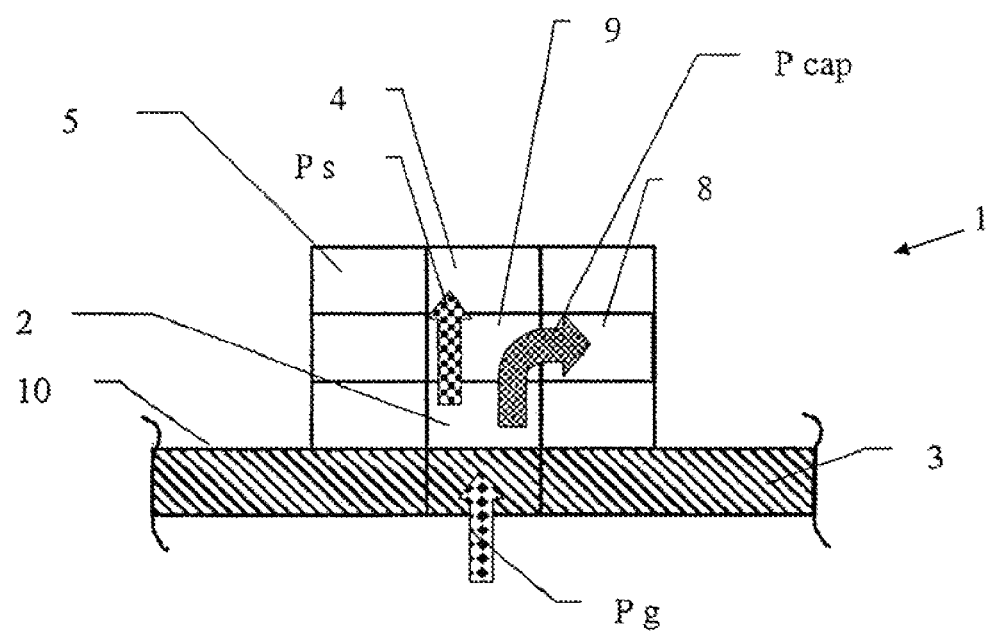
FIG. 1 is a schematic longitudinal sectional view through a sensor housing of a device according to the invention, the device being in a position in contact with the skin of the living being.

Referring to the drawings in particular, a device for measuring the body temperature of a living being, especially a human being, has a sensor or a sensor housing 1, which is integrated, for example, in a head strap of a protective helmet, for determining the body temperature of the human being, as this is disclosed in DE 101 39 705 A1 (corresponding to U.S. patent application Ser. No. 11/339,577 filed Jan. 26, 2006, which is hereby incorporated by reference). The sensor housing 1 is positioned at the head strap, not shown, such that a first temperature sensor 2 arranged in the sensor housing 1 is directly in contact with the scalp 10 of the human being. The first temperature sensor 2 is used to detect a skin temperature $T_{h1}$ of the head. On a side of the first temperature sensor 2 facing away from the skin 3, a second temperature sensor 4, positioned at a spaced location from the first temperature sensor 2, is arranged within the sensor housing 1 for detecting a temperature $T_{h2}$. The intermediate space between the first temperature sensor 2 and the second temperature sensor 4 is filled by an insulating material 9, for example, a foam or insulating wool. The second temperature sensor 4 is therefore arranged in a heat-insulated manner in relation to the first temperature sensor 2. The second temperature sensor 4 is arranged on a side of the sensor housing 1 facing away from the skin 3.

Furthermore, an analyzing unit 5, which is coupled electrically with the first temperature sensor 2 and the second temperature sensor 4 and has essentially a computing means 14 provided with an amplifier, a transmitting/receiving means, a contact switch, as well as a power supply means, is integrated in the sensor housing 1. The analyzing unit 5 can be switched on and off by means of a switch. For example, the switch may be designed as a pressure-actuated switch in the known manner, so that the analyzing unit 5 and hence the device is switched on automatically after putting on the head strap.

The measured data determined by the temperature sensors 2 and 4, which are analyzed and processed in the analyzing unit 5, are transmitted via the transmitting/receiving means to a remote receiving means, which has a transmitting/receiving means, an analyzing circuit, a display means as well as an alarm means. The receiving means may be located on the body of the user of the head strap, so that the person wearing the device can directly read the measured body temperature. As an alternative, the receiving means may also be accommodated in a central monitoring station.

It is already known that the body temperature $T_c$ of the human being can be calculated in the analyzing unit 5 according to the following temperature formula:

$$T_c = T_{h1} + \frac{K_s}{K_g} \cdot (T_{h1} - T_{h2}),$$

in which $T_c$=core temperature, body core temperature, $T_{h1}$=skin temperature measured by the first temperature sensor 2, $T_{h2}$=temperature measured by the second temperature sensor 4, $K_s$=coefficient of thermal conductivity of sensor housing, $K_g$=coefficient of thermal conductivity of the human tissue.

To increase the precision of the measurement, especially under cool environmental conditions, a compensating means, which compensates measuring errors as a consequence of the relatively low ambient temperature, for example, 5° C., is integrated according to the present invention in the analyzing unit 5. The temperature formula $T_c$, which is known per se, is expanded by a compensation term 6, which takes into account the heat capacity of the sensor housing 1. The compensation term takes into account, in particular, the thermal output that is necessary for heating up the sensor housing 1 in order to calculate a correct core temperature $T_c$. By linking the compensation term 6 with the known temperature formula $T_c$, an expanded temperature formula $T_c'$ is obtained for measuring the body temperature as follows:

$$T_c' = T_{h1} + \frac{K_s}{K_g} \cdot (T_{h1} - T_{h2}) + \underbrace{m_s \cdot \frac{c_s}{(t_{ab} \cdot K_s \cdot A_s)} \cdot (T_{s2} - T_{s1})}_{6}$$

in which $m_s$=weight of sensor 1, $c_s$=specific heat capacity of sensor 1, $t_{ab}$=time difference between the later point in time 2 and the earlier point in time 1, $A_s$=area of sensor 1, $T_{s1}$=temperature of sensor 1 at point in time 1, $T_{s2}$=temperature of sensor 1 at point in time 2.

The compensation term 6 forms a temperature correction value $T_K$, which takes into account the change over time in the sensor temperature $T_s$ and hence the heating of the sensor housing 1 that becomes established and of the space surrounding the temperature sensor 1 after the sensor housing 1 has come into contact with the skin 3 of the body.

To determine the sensor temperature $T_s$ or $T_{s1}$, $T_{s2}$, the mean value is formed between the skin temperature $T_{h1}$ measured by the first temperature sensor 2 and the temperature $T_{h2}$ measured by the second temperature sensor, as this becomes clear from the following equation:

$$T_s = \frac{(T_{h1} + T_{h2})}{2}$$

As a result, it is thus advantageously possible to eliminate the need for integrating another temperature sensor within the sensor housing.

The compensation term 6 contains quasi a differential part $d(T_{s2}-T_{s1})/dt$, which takes into account the change in the sensor temperature $T_s$ over time. In case of great changes over time in the sensor temperature $T_s$, the compensation term 6 has the effect that a relatively high temperature correction value $T_K$ is formed for compensating the error from the heat capacity of the sensor 1. In the stabilized state of the sensor temperature $T_s$, in which this temperature is constant, the temperature correction value $T_K$ formed by the compensation term becomes zero. The lower the ambient temperature and the more rapidly the sensor temperature $T_s$ rises, the greater is the temperature correction value $T_K$ calculated by the compensation term 6.

Figure 2:
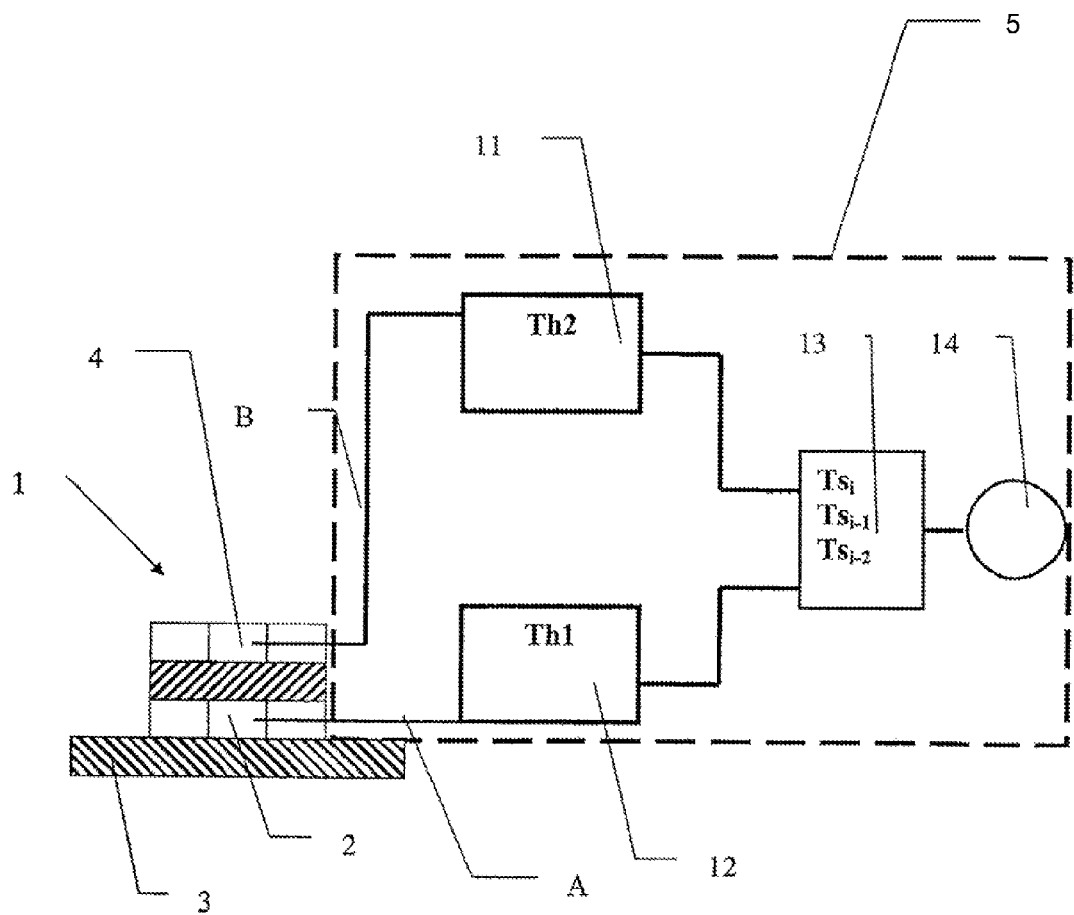
FIG. 2 is a block diagram of an analyzing unit of the device.

FIG. 2 shows the determination of the temperature correction value $T_K$ in more detail. The analyzing unit 5 comprises a first temperature sensor analyzing section 12 and a second temperature sensor analyzing section 11. The first temperature sensor analyzing section 12 is coupled with the first temperature sensor 2 and receives from this a temperature signal A, which is analyzed in the first temperature sensor analyzing section 12 to form a temperature value $T_{h1}$. The second temperature sensor analyzing section 11 is coupled with the second temperature sensor 4 and receives from this a temperature signal B, which is analyzed in the second temperature sensor analyzing section 11 to form a temperature value $T_{h2}$. The temperature values $T_{h1}$, $T_{h2}$ made available at the same point in time are sent synchronously to a storage means 13, in which a mean value $T_{si}$, $T_{si-1}$, $T_{si-2}$ is formed sequentially at predetermined time intervals $t_{ab}$ from the temperature values $T_{h1i}$, $T_{h1i-1}$, $T_{h1i-2}$ and $T_{h2i}$, $T_{h2i-1}$, $T_{h2i-2}$, and at least two temperature sensor values $T_{si}$, $T_{si-1}$, calculated consecutively in time, are stored. The core temperature $T_c'$ is then calculated in a computing means 14, which is in connection with the storage means 13, taking into account the compensation term 6.

Figure 3:
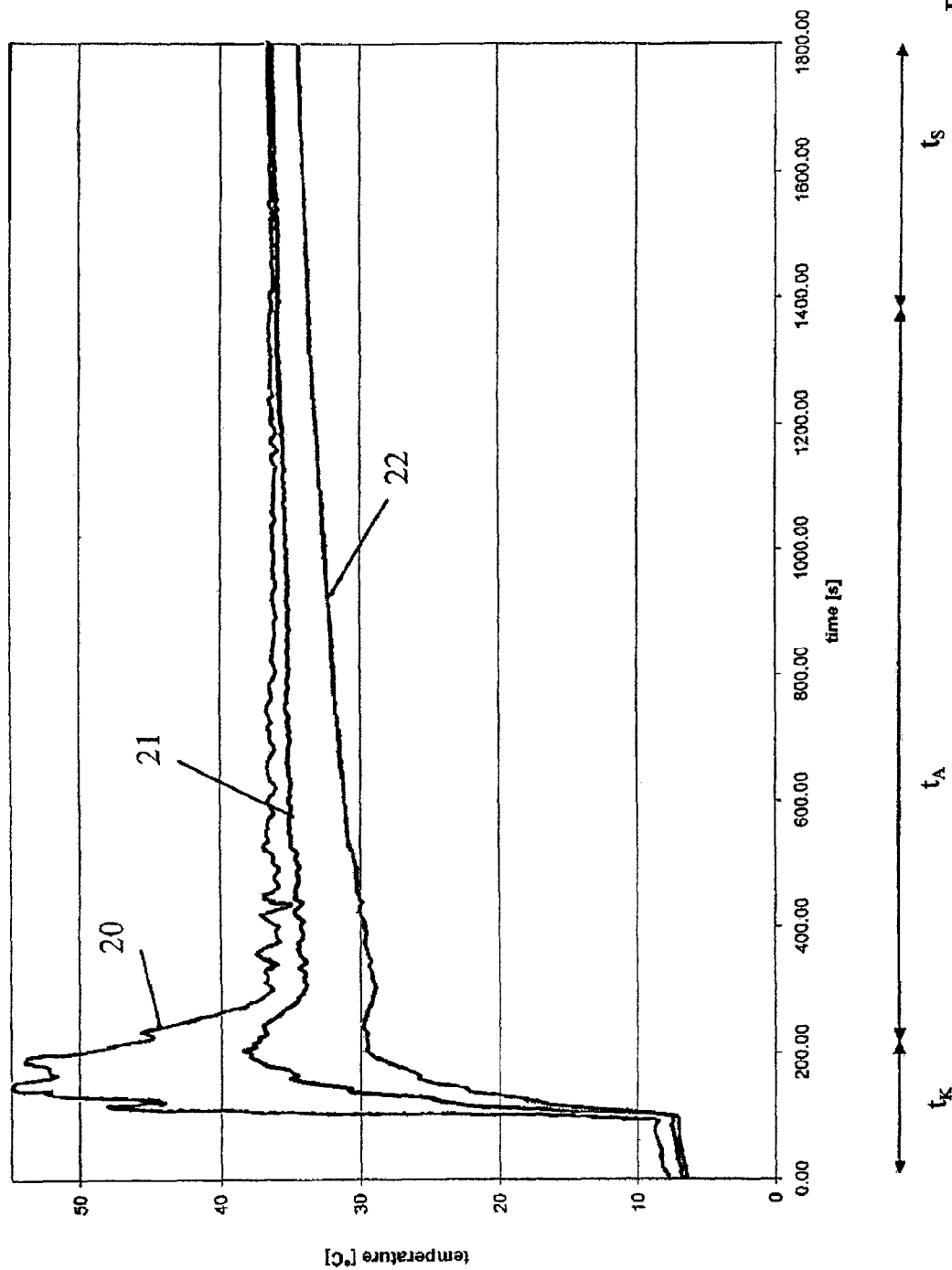
FIG. 3 is a temperature diagram over time with representation of the adaptation according to the present invention to the body temperature compared to temperature curves of prior-art alternative devices.

FIG. 3 shows a temperature diagram over time, which represents the curve of the calculated body temperatures based on different temperature formulas. The temperature curve according to the temperature formula $T_c'$ according to the present invention is designated by reference number 20. Reference number 21 designates the curve of the calculated body temperature taking into account the heat loss of sensor 1 according to DE 10 2005 004 933 B3. Reference number 22 designates a calculated body temperature value $T_c$ according to the simple body core temperature formula given above without taking into account the temperature correction value $T_K$.

It shall be assumed that a test subject is in a room with a room temperature of about 5° C. and a relatively high air velocity for a rather long time. The sensor housing 1 is likewise located in this room and has assumed the room temperature before the sensor housing 1 is placed on and attached to the scalp 10. The measuring operation shown in FIG. 3 can be divided into three periods. Intense equalization processes, which do not make it possible to obtain a meaningful measuring result, take place in a first contact time period $t_K$, which may be 200 sec. The temperature sensor 2 has not yet warmed up to the skin temperature $T_{h1}$ to be measured during this contact time period $t_K$.

The temperature curves 20, 21, 22 rise during a second adaptation time period $t_A$ corresponding to different E-functions, until they pass over into a stabilization time period $t_S$, in which the temperature end value is approximately reached.

It becomes clear that the calculation of the body temperature according to formula $T_c'$ according to the present invention yields a constant and correct body temperature value already after 5 to 6 minutes. The temperature curve 21 reaches the actual body temperature value of 37° C. only after about 16 minutes and therefore calculates a body temperature value that is too low by about 2° K during the adaptation time period $t_A$ and the stabilization time period $t_S$. Curve 22 corresponding to the simple body temperature formula has an even greater deviation from the actual body temperature.

FIG. 1 shows, furthermore, a heat flux $P_g$, which flows from a tissue 3 of the body via the scalp 10 to the sensor housing 1. A heat flux $P_s$ flows via the insulating material 9 between the first temperature sensor 2 and the second temperature sensor 4. A part $P_{cap}$ of this heat flux $P_s$ is lost for heating the heat capacity 8 of the sensor housing 1. This part is taken into account in the compensation term 6.

The time difference $T_{ab}$, at which the temperatures $T_{h1}$, $T_{h2}$ are measured sequentially, may be in the millisecond or second range.

While a specific embodiment of the invention has been shown and described in detail to illustrate the application of the principles of the invention, it will be understood that the invention may be embodied otherwise without departing from such principles.

What is claimed is:

1. A device for measuring the body temperature of a living being, the device comprising:

a sensor housing;

a first temperature sensor connected to said sensor housing for placement on the skin of the body for detecting a skin temperature of the living being;

a second temperature sensor connected to said sensor housing and arranged on a side of said first temperature sensor facing away from the body at a spaced location therefrom for detecting another temperature;

an analyzing unit for calculating body temperature according to a predetermined temperature formula containing a temperature difference, which is calculated from the temperatures measured by said first temperature sensor and said second temperature sensor and a compensation term expanding the temperature formula, said compensation term depending on a change over time in a sensor temperature based on said detected skin temperature and said another temperature and parameters for determining a temperature correction value to take into account the heating of said sensor housing and/or a heating of a space surrounded by said sensor housing by the contact between said sensor housing and the skin of the body, said analyzing unit having a computing means and a storage means, wherein at least two consecutive values of said sensor temperature measured at a predetermined time interval are stored in said storage means.

2. A device in accordance with claim 1, wherein said compensation term forms a compensation for the heat flux occurring during the measuring operation from the body to said sensor housing wherein said heat flux becomes established based on a side of said sensor housing facing the skin and a side of said sensor housing facing away from the skin.

3. A device in accordance with claim 1, wherein said sensor temperature is formed by taking the mean of said skin temperature detected by said first temperature sensor and said another temperature detected by said second temperature sensor.

4. A device in accordance with claim 1, wherein said compensation term depends on a heat capacity of said sensor housing.

5. A device in accordance with claim 1, wherein said compensation term contains said parameters, said parameters being constant wherein one of said parameters is a weight of said sensor housing and another parameter is a specific heat capacity of said sensor housing.

6. A device in accordance with claim 1, wherein said compensation term has as a constant parameter based on a time difference between two points in time, each at which a sensor temperature value can be determined.

7. A device in accordance with claim 1, wherein an insulating material is arranged between said first temperature sensor and said second temperature sensor.

8. A method for measuring the body temperature of a living being, the method comprising:

providing a sensor housing with a first temperature sensor connected to said sensor housing for placement on the skin of the body for detecting a skin temperature of the living being and a second temperature sensor connected to said sensor housing and arranged on a side of said first temperature sensor facing away from the body at a spaced location therefrom for detecting another temperature;

calculating a body temperature with an analyzing unit using a temperature formula, which is obtained by equating the heat flux between the tissue of the body and the sensor housing, wherein at least two sensor temperature values are determined with an offset in time, so that a temperature correction value is determined as a function of parameters determining the heat capacity of said sensor housing, said temperature correction value corresponding to a thermal output applied to one of said sensor housing and said first temperature sensor until a heat flux equilibrium is established between said one of said sensor housing and said first temperature sensor and the tissue of the body.

9. A method in accordance with claim 8, wherein said sensor temperature values are formed by taking the mean of skin temperature determined by the first temperature sensor and a temperature of said sensor housing, which is determined by the second temperature sensor arranged on a side facing away from the skin.

10. A method in accordance with claim 8, wherein said analyzing unit comprises a computing means and a storage means, wherein said at least two sensor temperature values are stored in said storage means.

11. A device for measuring the body temperature of a living being, the device comprising:

a sensor housing;

a first temperature sensor connected to said sensor housing for placement on the skin of the body for detecting a skin temperature of the living being;

a second temperature sensor connected to said sensor housing and arranged on a side of said first temperature sensor facing away from the body at a spaced location therefrom for detecting another temperature;

an analyzing unit for calculating body temperature based on a temperature difference of the temperature measured by said first temperature sensor and the temperature measured by said second temperature sensor and a compensation term depending on a change over time in a sensor temperature based on said detected skin temperature and said another temperature as a function of parameters determining the heat capacity of the device, said analyzing unit comprising a computing means and a storage means, wherein at least two consecutive values of said sensor temperature measured at a predetermined time interval are stored in said storage means.

12. A device in accordance with claim 11, wherein said compensation term forms a compensation for the heat flux occurring during the measuring operation from the body to said sensor housing wherein said heat flux becomes established based on a side of said sensor housing facing the skin and a side of said sensor housing facing away from the skin.

13. A device in accordance with claim 11, wherein said sensor temperature is formed by taking the mean of said skin temperature detected by said first temperature sensor and said another temperature detected by said second temperature sensor.

14. A device in accordance with claim 11, wherein said heat capacity of the sensor is based on a heat capacity of said sensor housing.

15. A device in accordance with claim 11, wherein said heat capacity of the sensor is based on a weight of said sensor housing and a specific heat capacity of said sensor housing.

16. A device in accordance with claim 11, wherein said compensation term has a constant parameter based on a time difference between two points in time, each at which a sensor temperature value can be determined.

17. A device in accordance with claim 11, wherein an insulating material is arranged between said first temperature sensor and said second temperature sensor.

* * * * *